United States Patent
Ricard et al.

(10) Patent No.: US 12,223,683 B2
(45) Date of Patent: Feb. 11, 2025

(54) METHOD FOR ENCODING DEPTH VALUES OF A SET OF 3D POINTS ONCE ORTHOGONALLY PROJECTED INTO AT LEAST ONE IMAGE REGION OF A PROJECTION PLANE

(71) Applicant: InterDigital VC Holdings, Inc., Wilmington, DE (US)

(72) Inventors: Julien Ricard, Cesson-Sevigne (FR); Celine Guede, Cesson-Sevigne (FR); Yannick Olivier, Cesson-Sevigne (FR); Joan Llach Pinsach, Cesson-Sevigne (FR)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

(21) Appl. No.: 18/225,704

(22) Filed: Jul. 25, 2023

(65) Prior Publication Data

US 2024/0005560 A1    Jan. 4, 2024

Related U.S. Application Data

(63) Continuation of application No. 17/046,653, filed as application No. PCT/US2019/026459 on Apr. 9, 2019, now Pat. No. 11,756,234.

(30) Foreign Application Priority Data

Apr. 11, 2018    (EP) .................................... 18305437

(51) Int. Cl.
*G06T 9/00* (2006.01)

(52) U.S. Cl.
CPC .................................... *G06T 9/001* (2013.01)

(58) Field of Classification Search
None
See application file for complete search history.

(56) References Cited

U.S. PATENT DOCUMENTS

| 1,145,643 A | 7/1915 | Woodward |
| 9,915,827 B2 * | 3/2018 | Gordon ................ G01B 11/167 |
| 10,783,668 B2 * | 9/2020 | Sinharoy .................. G06T 7/55 |

(Continued)

FOREIGN PATENT DOCUMENTS

| CN | 101754039 A | 6/2010 |
| CN | 107633539 A | 1/2018 |

(Continued)

OTHER PUBLICATIONS

"English Language Translation, WO Publication No. 2018039871", 52 pages.

(Continued)

*Primary Examiner* — Anand P Bhatnagar
(74) *Attorney, Agent, or Firm* — Condo Roccia Koptiw LLP

(57) ABSTRACT

At least one embodiment relates to a method comprising encoding a projection mode associated with an image region of a first depth image, said projection mode indicating if said image region stores either the minimum or the maximum depth value of at least one orthogonally projected 3D point of the point cloud along a same projection direction; and encoding said depth minimum and maximum depth values as a function of said projection mode.

21 Claims, 8 Drawing Sheets

(56) References Cited

U.S. PATENT DOCUMENTS

| | | | |
|---|---|---|---|
| 10,909,725 B2* | 2/2021 | Mammou | H04N 19/597 |
| 11,109,045 B2 | 8/2021 | Urban et al. | |
| 11,405,643 B2* | 8/2022 | Schwarz | G06T 15/04 |
| 2014/0204088 A1 | 7/2014 | Kirk et al. | |
| 2015/0334418 A1 | 11/2015 | Shimizu et al. | |
| 2016/0050401 A1* | 2/2016 | Gordon | H04N 23/11 |
| | | | 348/744 |
| 2017/0094262 A1 | 3/2017 | Peterson et al. | |
| 2017/0150180 A1 | 5/2017 | Lin et al. | |
| 2017/0214943 A1 | 7/2017 | Cohen et al. | |
| 2019/0011721 A1* | 1/2019 | Gordon | G02B 27/4272 |
| 2019/0197739 A1* | 6/2019 | Sinharoy | G06T 9/00 |
| 2020/0153885 A1 | 5/2020 | Lee et al. | |
| 2020/0334866 A1* | 10/2020 | Lasserre | H04N 19/20 |
| 2021/0174559 A1 | 6/2021 | Nakagami et al. | |
| 2022/0094909 A1* | 3/2022 | Hannuksela | H04N 19/174 |
| 2022/0138990 A1* | 5/2022 | Fleureau | G06T 15/20 |
| | | | 382/232 |
| 2022/0191519 A1* | 6/2022 | Chevet | H04N 19/20 |
| 2023/0024615 A1* | 1/2023 | Salmon-Legagneur | |
| | | | H04N 13/161 |

FOREIGN PATENT DOCUMENTS

| | | |
|---|---|---|
| CN | 108605134 A | 9/2018 |
| EP | 3 151 559 A1 | 4/2017 |
| JP | 2016511457 A | 4/2016 |
| SG | 11202005374 U | 7/2020 |
| WO | 2018039871 A1 | 3/2018 |
| WO | 2018126228 A1 | 7/2018 |

OTHER PUBLICATIONS

ITU-T, , "Reference Software for ITU-T H.265 High Efficiency Video Coding", Recommendation Itu-T H.265.2, Series H: Audiovisual and Multimedia Systems, Infrastructure of Audiovisual Services—Coding of Moving Video, Oct. 2014, 12 pages.

Mammou, Khaled , "PCC Test Model Category 2 V0", ISO/IEC JTC1/SC29/WG11 N17248, Coding of Moving Picture and Audio, Macau, China, Oct. 2017, 11 pages.

Olivier, et al., "Per Patch Projection Optimization for TMC2" Technicolor, ISO/IEC JTC1/SC29/WG11, MPEG2018/m42644, San Diego, CA, United States, Apr. 2018, 8 pages.

* cited by examiner

METHOD FOR ENCODING DEPTH VALUES OF A SET OF 3D POINTS ONCE ORTHOGONALLY PROJECTED INTO AT LEAST ONE IMAGE REGION OF A PROJECTION PLANE

This application is a continuation of U.S. Ser. No. 17/046,653 (now U.S. Pat. No. 11,756,234), which is the National Stage Entry under 35 U.S.C. § 371 of Patent Cooperation Treaty Application No.PCT/US2019/026459, filed Apr. 9, 2019, which claims priority from United Kingdom Application No. 18305437.8, filed Apr. 11, 2018, the disclosures of which are incorporated by reference herein in their entireties.

FIELD

The present principles generally relate to coding and decoding of a point cloud representing the external surface of a 3D object. Particularly, but not exclusively, the technical field of the present principles are related to encoding/decoding of depth images representing the geometry of such a point cloud.

BACKGROUND

The present section is intended to introduce the reader to various aspects of art, which may be related to various aspects of the present principles that are described and/or claimed below. This discussion is believed to be helpful in providing the reader with background information to facilitate a better understanding of the various aspects of the present principles. Accordingly, it should be understood that these statements are to be read in this light, and not as admissions of prior art.

A point cloud is a set of data points in some coordinate system. In a three-dimensional coordinate system (3D space), these points are usually intended to represent the external surface of a 3D object. Each point of a point cloud is often defined by its location (X, Y, and Z coordinates in the 3D space) and possibly by other associated attributes such as a color, represented in the RGB or YUV color space for example, a transparency, a reflectance, a two-component normal vector, etc.

It is usual to represent a point cloud as a set of 6-components points (X, Y, Z, R, G, B) or equivalently (X, Y, Z, Y, U, V) where (X,Y,Z) defines the coordinates of a colored point in a 3D space and (R,G,B) or (Y,U,V) defines a color of this colored point.

Point clouds may be static or dynamic depending on whether or not the cloud evolves with respect to time. It should be noticed that in case of a dynamic point cloud, the number of points is not constant but, on the contrary, generally evolves with time. A dynamic point cloud is thus a time-ordered list of set of points.

Practically, point clouds may be used for various purposes such as culture heritage/buildings in which objects like statues or buildings are scanned in 3D in order to share the spatial configuration of the object without sending or visiting it. Also, it is a way to ensure preserving the knowledge of the object in case it may be destroyed; for instance, a temple by an earthquake. Such point clouds are typically static, colored and huge.

Another use case is in topography and cartography in which using 3D representations, maps are not limited to the plane and may include the relief. Google Maps is now a good example of 3D maps but uses meshes instead of point clouds. Nevertheless, point clouds may be a suitable data format for 3D maps and such point clouds are typically static, colored and huge.

Automotive industry and autonomous car are also domains in which point clouds may be used. Autonomous cars should be able to "probe" their environment to take good driving decision based on the reality of their immediate neighboring. Typical sensors like LIDARs produce dynamic point clouds that are used by the decision engine. These point clouds are not intended to be viewed by a human being and they are typically small, not necessarily colored, and dynamic with a high frequency of capture. They may have other attributes like the reflectance provided by the Lidar as this attribute is a good information on the material of the sensed object and may help the decision.

Virtual Reality and immersive worlds have become a hot topic recently and foreseen by many as the future of 2D flat video. The basic idea is to immerse the viewer in an environment all round him by opposition to standard TV where he can only look at the virtual world in front of him. There are several gradations in the immersivity depending on the freedom of the viewer in the environment. Colored point cloud is a good format candidate to distribute Virtual Reality (or VR) worlds. They may be static or dynamic and are typically of averaged size, say no more than millions of points at a time.

Point cloud compression will succeed in storing/transmitting 3D objects for immersive worlds only if the size of the bitstream is low enough to allow a practical storage/transmission to the end-user.

It is crucial to be able to distribute dynamic point clouds to the end-user with a reasonable consumption of bit-rate while maintaining an acceptable (or preferably very good) quality of experience. Efficient compression of these dynamic point clouds is a key point in order to make the distribution chain of immersive worlds practical.

Image-based point cloud compression techniques are becoming increasingly popular due to their combination of compression efficiency and low complexity. They proceed in two main steps: first, they project (orthogonal projection) the point cloud, i.e. the 3D points, onto 2D images. For example, at least one depth image represents the geometry of the point cloud, i.e. the spatial coordinates of the 3D points in a 3D space and at least one texture image represents an attribute associated with the 3D points of the point cloud, e.g. a texture/color information associated to those 3D points. Next, these techniques encode such depth and texture images with legacy video encoders.

Image-based point loud compression techniques achieve good compression performance by leveraging the performance of 2D video encoder, like for example HEVC ("*ITU-T H.265 Telecommunication standardization sector of ITU* (10/2014), *series H: audiovisual and multimedia systems, infrastructure of audiovisual services—coding of moving video, High efficiency video coding, Recommendation ITU-T H.265*"), while at the same time, they keep complexity low by using simple projection schemes.

One of the challenges of image-based point cloud compression techniques is that a point cloud may not be suitable for projection onto images, especially when the point distribution follows a surface with many folds (concave/convex regions, like in clothing) or when the point distribution does not follow a surface at all (like in fur or hair). In these situations, image-based point cloud compression techniques suffer from low compression efficiency (many small projections are required, reducing the efficiency of the 2D video compression) or bad quality (due to the difficulty of projecting the point cloud onto a surface).

One of the approaches used in the state of the art to alleviate this problem consists in projecting multiple geometry and texture information onto a same spatial location (pixel) of an image. This means that several depth and/or texture images may be generated per 3D point of the point cloud.

This is the case, for example, of the so-called Test Model Category 2 point cloud encoder (TMC2) as defined in ISO/IEC JTC1/SC29/WG11/N17248, Macau, China, October 2017, in which the point cloud is orthogonally projected onto a projection plane. Two depth values are then associated per coordinate of said projection plane: one representative of the depth value associated with the nearest point (smallest depth value) and another representative of the depth value of the farthest point (largest depth value). A first depth image is then generated from the smallest depth values (D0) and a second depth image is generated from the difference between the largest (D1) and smallest (D0) depth values satisfying D1−D0<=SurfaceThickness, where SurfaceThickness is the maximum surface thickness, for example equals to 4.

The depth images and associated metadata are then encoded and decoded. The geometry of the point cloud is then reconstructed from the decoded depth images. Next, color/texture is assigned to each point of the reconstructed point cloud and texture images (here two) are generated from said assigned colors/textures. The two texture images are then encoded.

SUMMARY

The following presents a simplified summary of the present principles in order to provide a basic understanding of some aspects of the present principles. This summary is not an extensive overview of the present principles. It is not intended to identify key or critical elements of the present principles. The following summary merely presents some aspects of the present principles in a simplified form as a prelude to the more detailed description provided below.

According to a general aspect of at least one embodiment, there is provided a method comprising encoding a projection mode associated with an image region of a first depth image, said projection mode indicating if said image region stores either the minimum or the maximum depth value of at least one orthogonally projected 3D point of the point cloud along a same projection direction; and encoding said depth minimum and maximum depth values as a function of said projection mode.

According to an embodiment, encoding said depth minimum and maximum depth values as function of said projection mode comprises encoding the minimum depth values as first image data and encoding an information representative of the maximum depth values as second image data when the projection mode equals a first value, and encoding the maximum depth values as first image data and encoding an information representative of the minimum depth values as second image data when the projection mode equals a second value.

According to an embodiment, the information representative of either the minimum or maximum depth values is the absolute difference between the maximum and minimum depth values.

According to an embodiment, the method further comprises transmitting said encoded image region and signaling said projection mode.

According to an embodiment, said projection mode is signaled at the point cloud level to indicate if said projection mode may change or not.

According to an embodiment, said projection mode is signaled at the patch level if said projection mode is signaled at the point cloud level as changing.

According to another general aspect of at least one embodiment, there is provided a method comprising obtaining a projection mode indicating if an image region of a first depth image stores either the minimum or the maximum depth value of at least one orthogonally projected 3D point of the point cloud along a same projection direction; and decoding said depth minimum and maximum depth values as a function of said projection mode.

According to an embodiment, decoding said depth minimum and maximum depth values as a function of said projection mode comprises decoding the minimum depth values as first image data and decoding an information representative of the maximum depth values as second image data when the projection mode equals a first value, and decoding the maximum depth values as first image data and decoding an information representative of the minimum depth values as second image data when the projection mode equals a second value.

According to an embodiment, the information representative of either the minimum or maximum depth values is the absolute difference between the maximum and minimum depth values.

According to an embodiment, said projection mode from a bitstream.

One or more of at least one embodiment also provide a device, a computer program product, a non-transitory computer-readable medium and a signal.

The specific nature of the present principles as well as other objects, advantages, features and uses of the present principles will become evident from the following description of examples taken in conjunction with the accompanying drawings.

BRIEF DESCRIPTION OF DRAWINGS

In the drawings, examples of several embodiments are illustrated. The drawings show.

Similar or same elements are referenced with the same reference numbers.

DESCRIPTION OF EXAMPLE OF THE PRESENT PRINCIPLES

Figure 1:
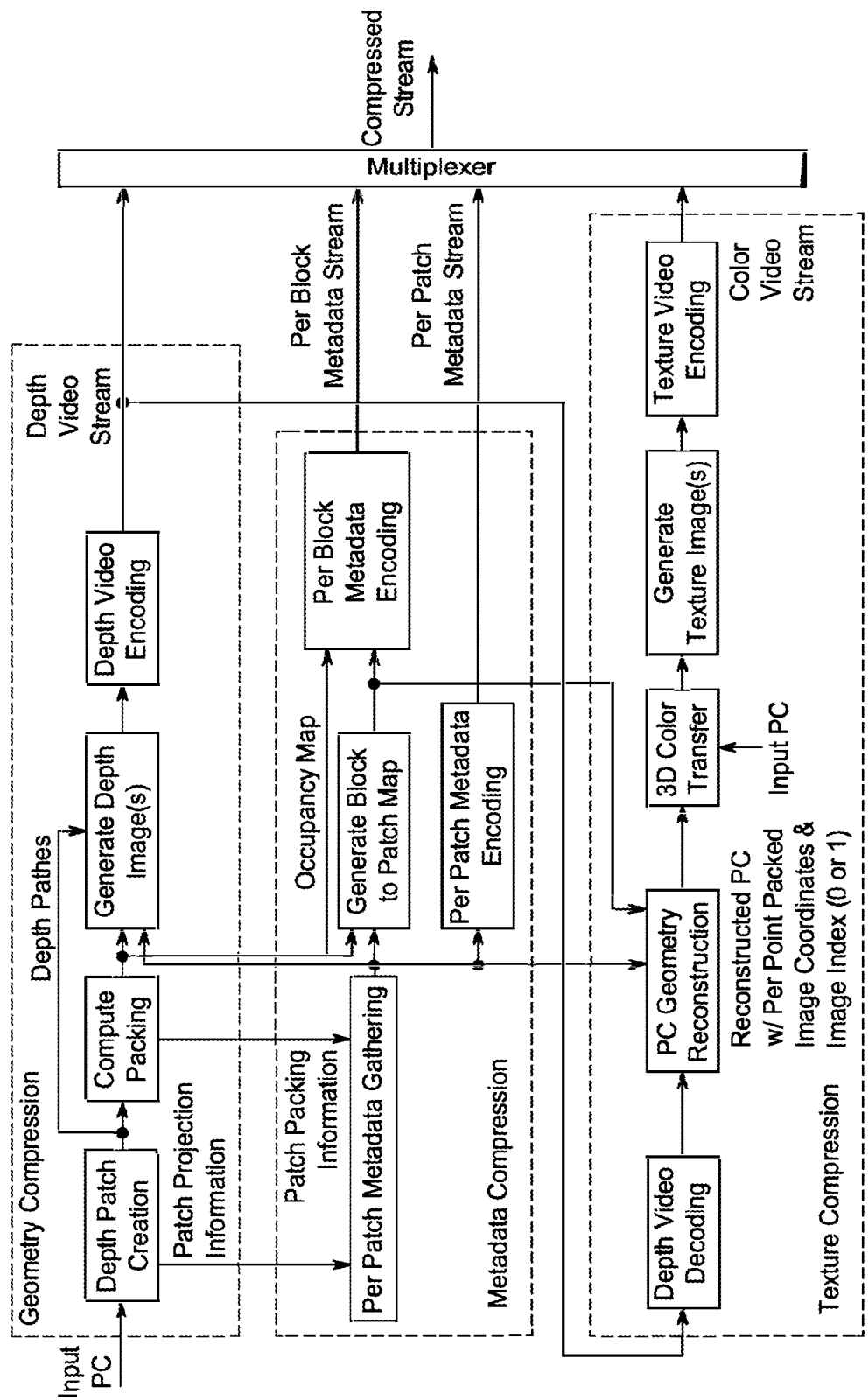
FIG. 1 illustrates a schematic block diagram of an example of an image-based point cloud encoding structure.

The present principles will be described more fully hereinafter with reference to the accompanying figures, in which examples of the present principles are shown. The present principles may, however, be embodied in many alternate forms and should not be construed as limited to the examples set forth herein. Accordingly, while the present principles are susceptible to various modifications and alternative forms, specific examples thereof are shown by way of examples in the drawings and will herein be described in detail. It should be understood, however, that there is no intent to limit the present principles to the particular forms disclosed, but on the contrary, the disclosure is to cover all modifications, equivalents, and alternatives falling within the spirit and scope of the present principles as defined by the claims.

The terminology used herein is for the purpose of describing particular examples only and is not intended to be limiting of the present principles. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to other element, there are no intervening elements present. As used herein the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the present principles.

Although some of the diagrams include arrows on communication paths to show a primary direction of communication, it is to be understood that communication may occur in the opposite direction to the depicted arrows.

Some examples are described with regard to block diagrams and operational flowcharts in which each block represents a circuit element, module, or portion of code which comprises one or more executable instructions for implementing the specified logical function(s). It should also be noted that in other implementations, the function(s) noted in the blocks may occur out of the order noted. For example, two blocks shown in succession may, in fact, be executed substantially concurrently or the blocks may sometimes be executed in the reverse order, depending on the functionality involved.

Reference herein to "in accordance with an example" or "in an example" means that a particular feature, structure, or characteristic described in connection with the example can be included in at least one implementation of the present principles. The appearances of the phrase in accordance with an example" or "in an example" in various places in the specification are not necessarily all referring to the same example, nor are separate or alternative examples necessarily mutually exclusive of other examples.

Reference numerals appearing in the claims are by way of illustration only and shall have no limiting effect on the scope of the claims.

While not explicitly described, the present examples and variants may be employed in any combination or subcombination.

The present principles are described for encoding/decoding the geometry of a point cloud from two depth images but extends to the encoding/decoding of a sequence of point clouds (temporally dynamic point cloud) because the geometry of the sequence of point clouds is encoded/decoded by/from two sequences (video) of depth images, the two depth images associated with a point cloud being encoded independently of the two depth images of another point cloud of the sequence.

In the following, the term "image region" designates a set of pixels of an image. These pixels may or may not be adjacent pixels but all of them share at least one common property.

For example, an image itself may be considered as being an image region. An image may also be split into multiple block and a block is then an image region.

An image region may also have a non-rectangular shape. This is the case, for example, when pixels of an image which have a same (or similar) extracted feature are associated to form an image region.

Examples of feature extracted from an image may be a color, texture, normal vector, etc. . . . .

FIG. 1 shows an overview of the TMC2 point cloud encoder. The top row (geometry compression) encodes the geometry information of the point cloud by means of a depth image. The middle row (metadata compression) encodes metadata required to reconstruct the geometry of the original point cloud from the depth image. The bottom row (texture compression) encodes the color (texture) information of the reconstructed geometry by means of color (texture) images.

Figure 2:
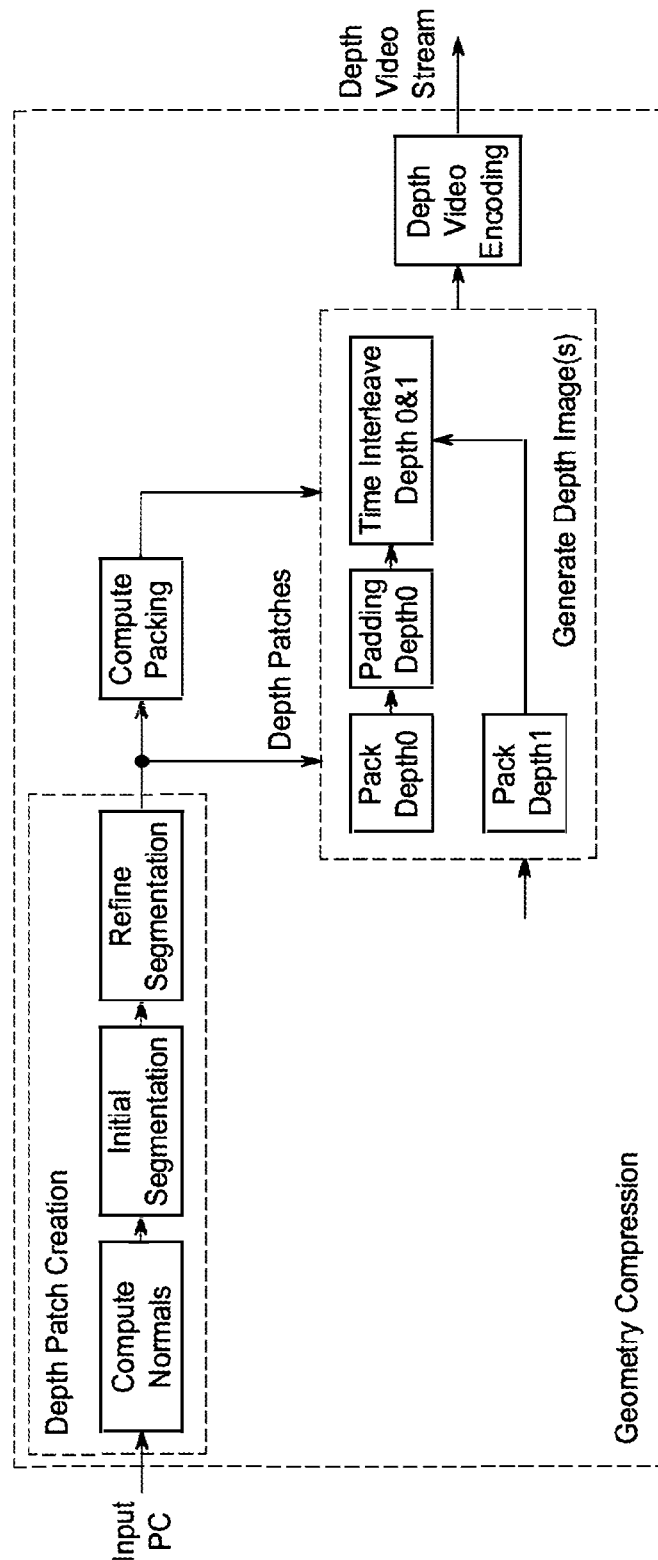
FIG. 2 illustrates the geometry compression part of the encoder of FIG. 1.

Let us look more in detail into the geometry compression part, shown in FIG. 2. First, the input point cloud (PC) is segmented into connected components (CCs), where each CC is a set of neighboring 3D points with similar normal. Each CC is projected onto one of the three main planes XY, XZ or YZ, choosing that which normal is closer to the average normal of the 3D points in the CC. The projection of geometry information consists in projecting the distance of each 3D point to the projection plane (depth) onto the projection plane. For instance, a 3D point $p=(x,y,z)$ from a CC projected to the XY plane would result in the value of z projected onto the (x,y) pixel of the XY plane. Depending on the distribution of 3D points in the CC, more than one value may be projected onto the same coordinate of the projection plane. The trivial approach would simply keep the value corresponding to the closest point (i.e. the smallest depth value), but this may not allow capturing more complex 3D point distributions (like folds in clothing). As shown in FIG. 2, the TMC2 test model keeps two values per coordinate of the projection plane: the smallest (depth0) and the largest (depth1) depth. By doing this, it better captures the distribution of points in 3D space, at the expense of increasing the amount of projected data to be encoded.

The projection of the CC results in patches: 2D images of the projected data. There are as many patches per CC as values are projected onto each coordinate of the projection plane. In TMC2, there are two depth patches (one for the minimum depth, one for the maximum depth). The patches storing minimum and maximum depth values are encoded as image data. Thus, in TMC2, two depth images are required: one for storing an information representative of minimum depth values and one for storing an information representative of maximum depth values.

Using several depth images per input point cloud (1) may still fail to properly capture the geometry of the point cloud, and (2) increases the overall bitrate, reducing compression efficiency.

Figure 3:
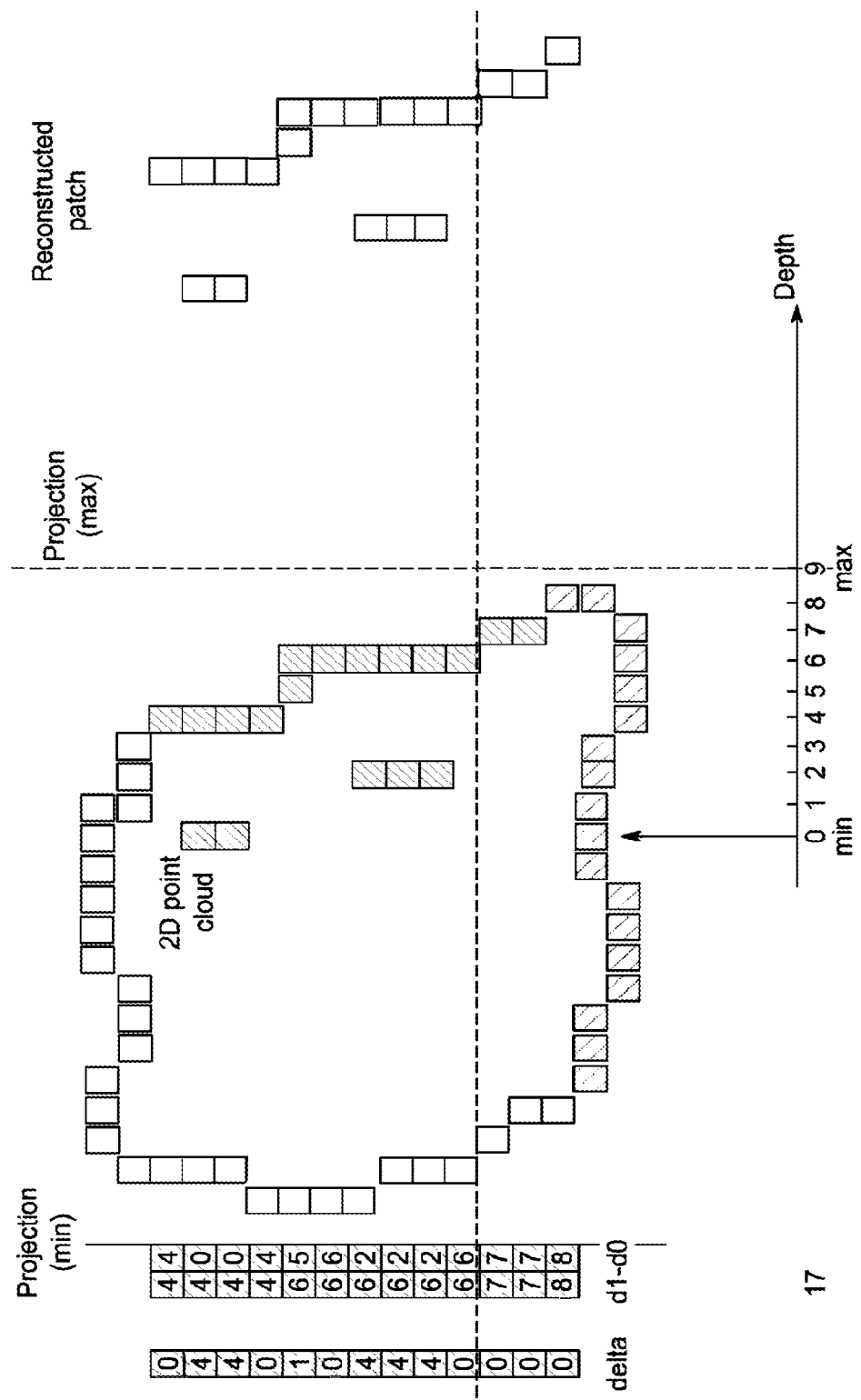
FIG. 3 shows a first example where a point cloud has been split in four CCs.

FIG. 3 shows a first example where a point cloud has been split in four CCs (points are represented by squares in different levels of grey and by hashed squares). We are focusing on the CC represented by hashed squares. The points of this CC are projected to a vertical "plane" (in the example, 2D point cloud projected into 1 D), resulting in some positions of the projection plane having more than one value (from 0 to 7 in this example).

As above explained, in TMC2, two depth values for each pixel of one projection image are stored. Said two depth values correspond to the minimum and maximum depth values of the projected points and have difference values lower than or equal to a threshold: the "surfaceThickness". The parameter equals 4 in the example of FIG. 3. This specific value provides good rate-distortion efficiency for the TMC2 Point Cloud video codec but is only provided here as a none limitative example.

In this first example, a few points of the CC (hashed squares) are disconnected from the main surface of the CC. Since the distances between the minimum and maximal depth values are lower than "surfaceThickness", the reconstructed CC (reconstructed patch) after de-projection is perfect, without any missing point. However, note that the patch that stored the minimum depth values doesn't follow the main external surface of the CC and becomes very noisy as shown in FIG. 3. It introduces high frequencies in the signal that This non-homogeneous patch will make the HEVC encoding more difficult and less efficient. That will increase bit rate associated to the first depth image and decrease the accuracy of the geometry reconstruction.

Moreover, a texture image may be also associated to the first depth image. In our example, lets consider a uniform color (e.g. value 240) on the main surface of the CC and a different color (e.g. value 16) for the points distant from the main surface. This color distribution, typical in point clouds, results in a texture patch associated to the minimum depth values that's noisy and hard to encode with HEVC due to the presence of high frequencies.

Figure 4:
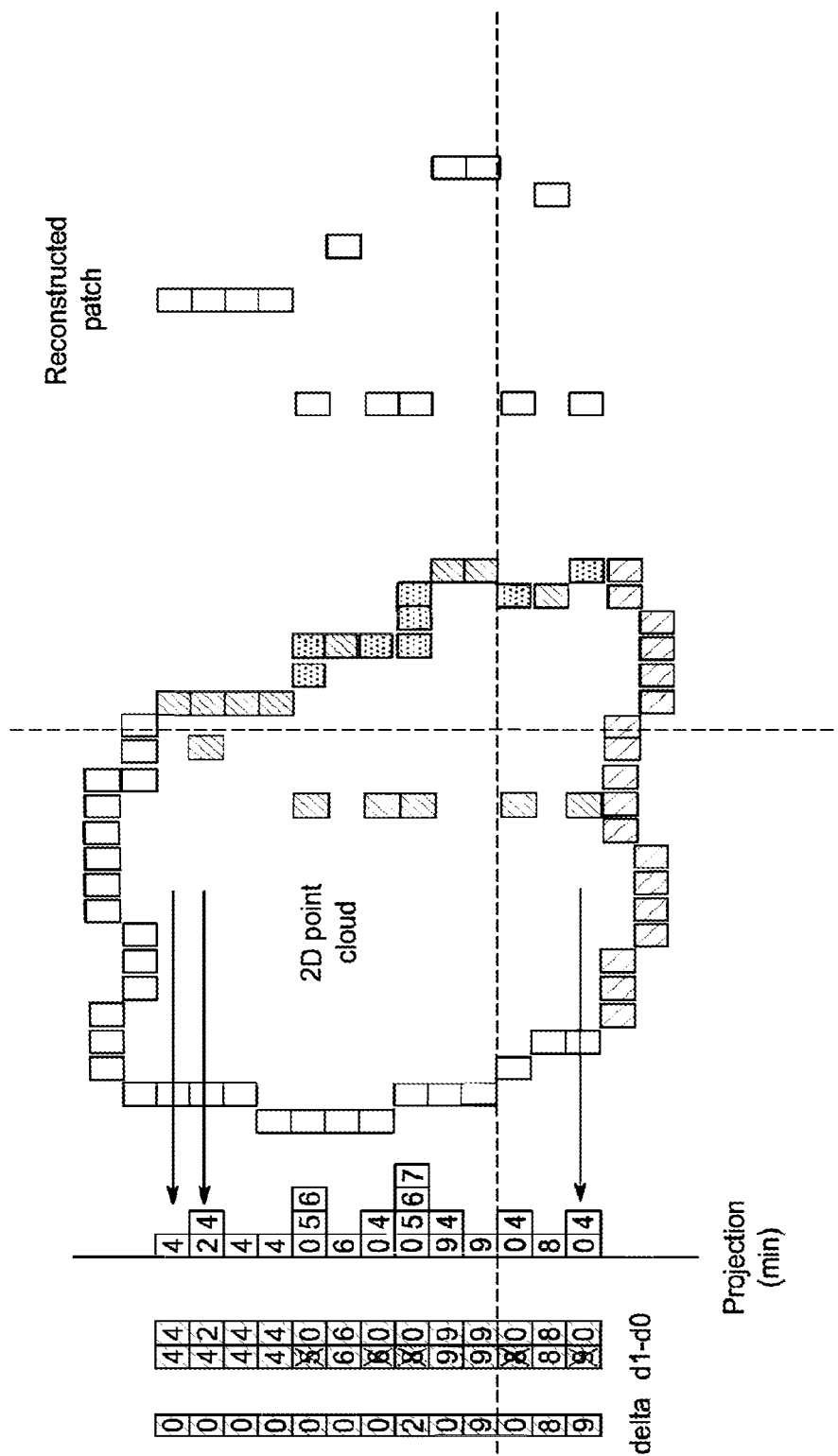
FIG. 4 shows a second example where a point cloud has been split in four CCs.

FIG. 4 shows a second example where a point cloud has been split in four CCs (points are represented by squares in different levels of grey and by hashed squares). This second example is similar to the first one where a point cloud has been also split in four CCs. The difference with the first example is that distances between minimum and maximal depth values are greater than "surfaceThickness" parameter (dotted squares). So, the maximum depth values are not retained and therefore the reconstructed CC after de-projection is of poor quality, with a lot of missing points. The fact that most of the missing points belong to the main 3D surface exacerbates the reconstruction problem (both objective metrics and visual quality). As in the first example, the patch is not homogeneous and very noisy. It introduces high frequencies in the signal that will make HEVC encoding very difficult and less efficient. That will increase bit rate associated to the first depth image and decrease the accuracy of the geometry reconstruction.

Moreover, a texture image may be also associated to the first depth image. In our example, let's consider a uniform color (e.g. value 240) on the main surface of the CC and a different color (e.g. value 16) for the points distant from the main surface. This color distribution, typical in point clouds, results in a texture patch associated to the minimum depth values that's very noisy and hard to encode with HEVC due to the presence of high frequencies.

According to a general aspect of at least one embodiment, there is provided a method that determines, for an image region, corresponding, typically, to the projection of a patch onto a projection plane, whether to store the minimum depth or the maximum depth values in the first depth image and to store in the second depth image an information representative the maximum or minimum value.

In the context of point cloud compression, the TMC2 codec tries to optimize the projection of each connected component by choosing among three possible projection directions. At least one of the present embodiment allows further optimizing the projection of each connected component by providing two different projection modes for each projection direction. This allows to better adjust the projection to the characteristics of the connected component.

Determining whether the minimum or the maximum depth values are stored in the first depth image (instead of always storing minimum depth values) improves the HEVC encoding performance, and therefore the performance on the entire TMC2v0 codec. Moreover, storing the maximum depth values decreases the number of missing points, and the remaining missing points are less likely to belong to the main 3D surface (see FIG. 7). That improves the objective quality metric (both geometry and texture) and drastically the visual quality of the reconstructed Point Cloud video.

Figure 5:
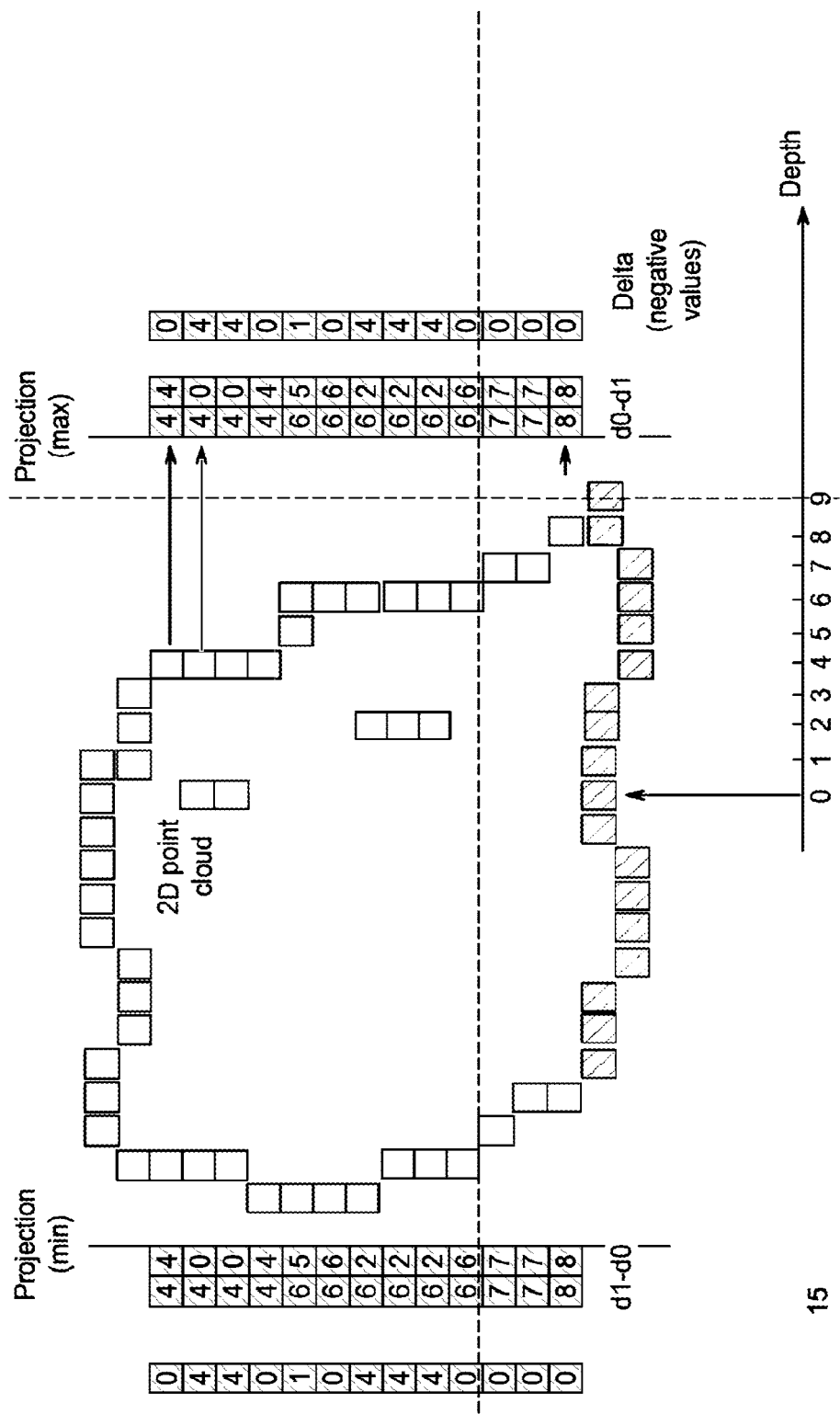
FIGS. 5 and 6 shows results of the method in accordance with at least one embodiment when applied on the first and second examples of FIGS. 3 and 4.
Figure 6:
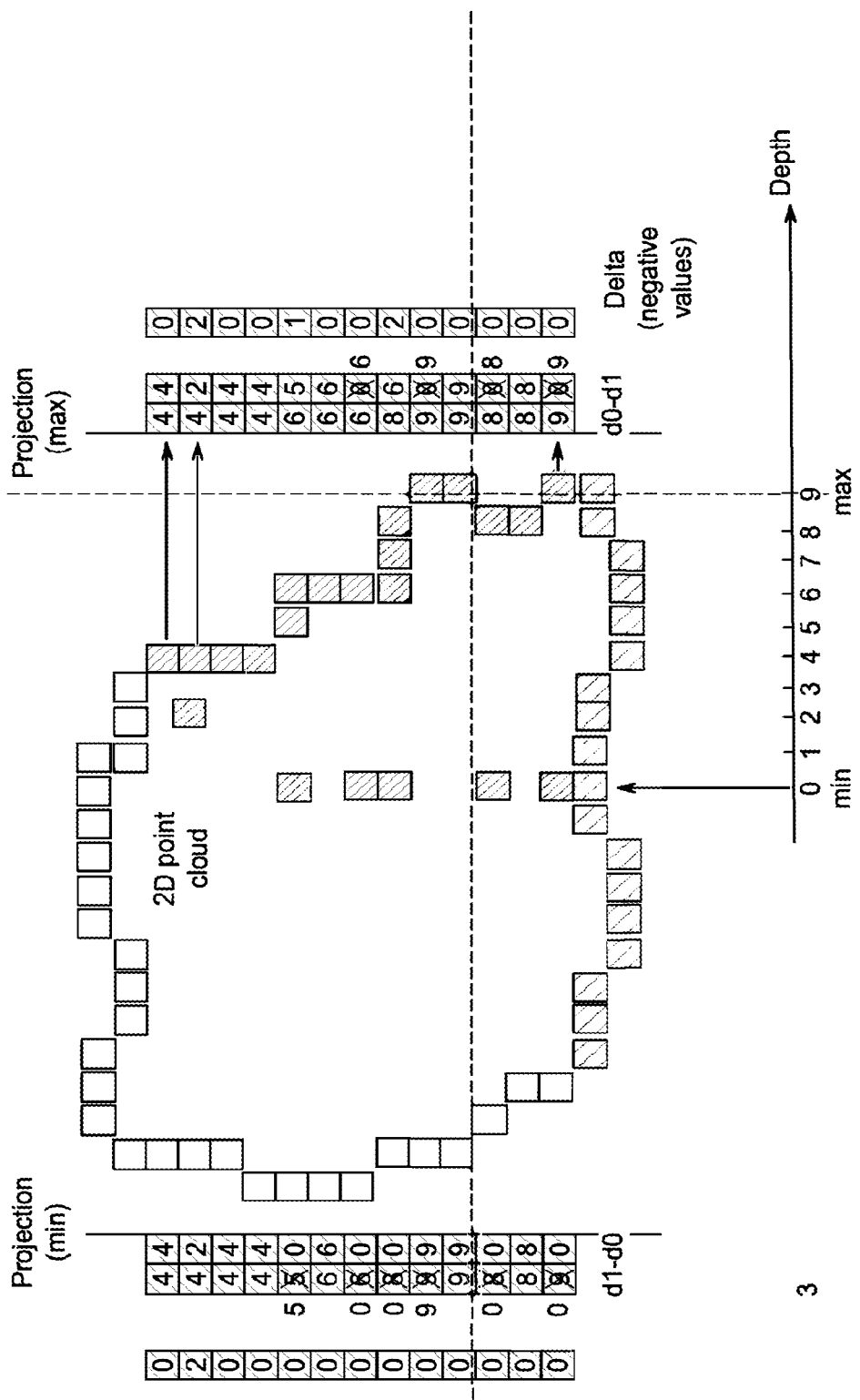

FIGS. 5 and 6 show results of the method in accordance with at least one embodiment when applied on the first and second examples of FIGS. 3 and 4.

In these examples, the projection of the connected component CC stores the minimum depth values in the first depth image denoted D0 (left side) or the maximum depth values in the first depth image D0 (right side).

As shown, for the connected component CC, if we decide to store the maximum depth value in the first depth image D0, the resulting is clearly more homogeneous than storing the minimum depth, which will boost the performance of HEVC encoding (the high frequencies have been removed).

Figure 7:
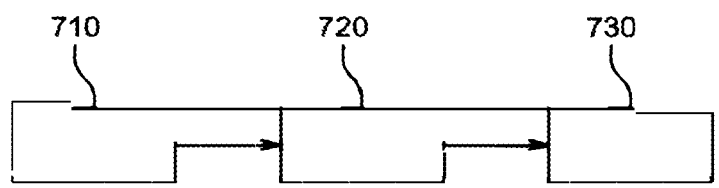
FIG. 7 shows a block diagram of the steps of a method for encoding the depth values of a point cloud in accordance with at least one embodiment.

FIG. 7 shows a block diagram of the steps of a method for encoding the depth values of a point cloud in accordance with at least one embodiment.

In step 710, a module determines if a projection mode indicates if an image region of a first depth image stores either the minimum or the maximum depth value of at least one orthogonally projected 3D point of the point cloud along a same projection direction.

In step 720, a module encodes said depth minimum and maximum depth values as a function of said projection mode.

According to an embodiment of step 720, the module encodes said depth minimum and maximum depth values as a function of said projection mode comprises encoding the minimum depth values as first image data and encoding an information representative of the maximum depth values as second image data when the projection mode equals a first value, and encoding the maximum depth values as first image data and encoding an information representative of the minimum depth values as second image data when the projection mode equals a second value.

According to an embodiment, the information representative of either the minimum or maximum depth values is the absolute difference between the maximum and minimum depth values.

According to an embodiment, in step 730, a module transmits said encoded image region of the first and, possibly, second depth image and said projection mode.

According to an embodiment of step 730, said projection mode is signaled at the point cloud level to indicate if said projection mode may change or not.

According to an embodiment of step 730, said projection mode is signaled at the patch level if said projection mode is signaled at the point cloud level as changing.

Thus, even if the projection mode is just one bit per patch, coding it for all patches is not optimal when its value is constant (i.e. the same for all patches). Signaling at the higher level if the projection mode remains unchanged or not saves bitrate.

When applied to TMC2, one of the embodiment may be used to project 3D points (from 3D space) to pixels in 2D image. In other words, an implementation of one of the embodiment may project a connected component (3D) into a patch (2D) as follows:

For a Connected Component CC, a module selects the projection direction (X, Y or Z axis) and set these parameters normalAxis, tangentAxis, bitangentAxis according to the selected projection direction: normalAxis, respectively tangentAxis and bitangentAxis refers to shift to be applied to reconstructed patch points along the normal, respectively tangent and bitangent axis of patch.

In step 710, a projection mode ProjectionMode is determined.

In step 720, a first depth image is initialized by:

$p \cdot d0 = $ invalid where p·d0 means a depth value of a pixel p of the first depth image and "invalid" indicates an initial value.

Next, for each point p of the current connected component CC, performing the projection on the current point p by:

$D1 = $ dpdu_3d_shift_normal_axis[frmIdx][patchIndex]

$U1 = $ dpdu_3d_shift_tangent_axis[frmIdx][patchIndex]

$V1 = $ dpdu_3d_shift_bitangent_axis[frmIdx][patchIndex]

where dpdu_3d_shift_tangent_axis[frmIdx][p] specifies the difference between the shift to be applied to reconstructed patch points along the tangent axis of patch with index p in patch frame frmIdx and of the shift to be applied to the reconstructed patch points along the tangent axis of patch with index PredIdx in patch frame RefIdx. The value of dpdu_3d_shift_tangent_axis[frmIdx][p] shall be in the range of $(-2^{gps\_geometry\_3d\_coordinates\_bitdepth\_minus1+1}+1)$ to $(2^{gps\_geometry\_3d\_coordinates\_bitdepth\_minus1+1}-1)$, inclusive, dpdu_3d_shift_bitangent_axis[frmIdx][p] specifies the difference between the shift to be applied to the reconstructed patch points along the bitangent axis of patch with index p in patch frame frmIdx and of the shift to be applied to the reconstructed patch points along the bitangent axis of patch with index PredIdx in patch frame RefIdx. The value of dpdu_3d_shift_bitangent_axis[frmIdx][p] shall be in the range of $(-2^{gps\_geometry\_3d\_coordinates\_bitdepth\_minus1+1}+1)$ to $(2^{gps\_geometry\_3d\_coordinates\_bitdepth\_minus1+1}-1)$, inclusive, and dpdu_3d_shift_normal_axis[frmIdx][p] specifies the difference between the shift to be applied to the reconstructed patch points along the normal axis of patch with index p in patch frame frmIdx and of the shift to be applied to the reconstructed patch points along the normal axis of patch with index PredIdx in patch frame RefIdx. The value of dpdu_3d_shift_normal_axis[frmIdx][p] shall be in the range of $(-2^{gps\_geometry\_3d\_coordinates\_bitdepth\_minus1+1}+1)$, to $(2^{gps\_geometry\_3d\_coordinates\_bitdepth\_minus1+1}-1)$, inclusive.

According to an embodiment of step 720, if the projection mode ProjectionMode==0 (first value) then storing the minimum depth value of the current point p in the first depth image:

$p \cdot d0[u,v] = \min(d, p \cdot d0[u,v])$

Next, if the projection mode ProjectionMode==1 (second value) then storing the maximum depth value of the current point p in the first depth image:

$p \cdot d0[u,v] = \max(d, p \cdot d0[u,v])$

Next, a second depth image is initialized.

$p \cdot d1 = p \cdot d0$ where p·d1 means a depth value of a pixel p of the second depth image.

Next, for each point p of the current connected component CC, performing the projection on the current point p by:

$d = \text{point}[p \cdot \text{normalAxis}] - p \cdot D1$ $u = \text{point}[p \cdot \text{tangentAxis}] - p \cdot U1$ $v = \text{point}[p \cdot \text{bitangentAxis}] - p \cdot V1$ if the projection mode ProjectionMode==0 (first value) and if the current pixel is valid, if $(((d - p \cdot d0[u,v]) <= \text{surfaceThickness})$ and $(d > p \cdot d1[u,v]))$ then $p \cdot d1[u,v] = d$ if the projection mode ProjectionMode==1 (second value) and if the current pixel is valid, if $(((p \cdot d0[u,v] - d) <= \text{surfaceThickness})$ and $(d < p \cdot d1[u,v]))$ then $p \cdot d1[u,v] = d$ The result of said implementation of at least one embodiment may produce two depth images.

In the TMC2, depth values in the first depth image are directly encoded. Depth values in the second depth image, however, may be encoded as a delta w.r.t. D0: delta_depth=d1−d0.

In accordance with at least one embodiment, the delta_depth used to encode depth values in the second depth image d1 may be computed as delta_depth=abs($d1-d0$)

where 'abs' denotes absolute value.

Figure 8:
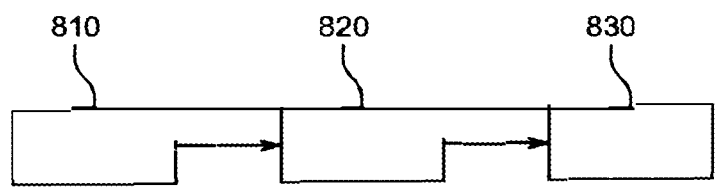
FIG. 8 shows a block diagram of the steps of a method for decoding depth values of at least one 3D point of a point cloud in accordance with at least one embodiment.

FIG. 8 shows a block diagram of the steps of a method for decoding depth values of at least one 3D point of a point cloud in accordance with at least one embodiment.

In step 810, a module obtains a projection mode indicating if an image region of a first depth image stores either the minimum or the maximum depth value of at least one orthogonally projected 3D point of the point cloud along a same projection direction.

Minimum and maximum depth values are determined from a projection plane. Thus, when a first projection plane and a second projection plane are parallel, then a minimum, respectively maximum, depth value determined from the first projection plane is equivalent to the maximum, respectively minimum, value determined from the second projection plane. In other words, the term minimum and maximum depth values are relative terms that are defined from a projection plane.

In step 820, a module decodes said depth minimum and maximum depth values as a function of said projection mode.

According to an embodiment of step 820, the module decodes said depth minimum and maximum depth values as a function of said projection mode comprises decoding the minimum depth values as first image data and decoding an information representative of the maximum depth values as second image data when the projection mode equals a first value, and decoding the maximum depth values as first image data and decoding an information representative of the minimum depth values as second image data when the projection mode equals a second value.

According to an embodiment, the information representative of either the minimum or maximum depth values is the absolute difference between the maximum and minimum depth values.

According to an embodiment, in step 830, a module derives said projection mode from a bitstream.

When applied to TMC2, one of the embodiment may be used to derive the depth value of at least one 3D point (to reconstruct the geometry of said at least one 3D point) from a first and a second depth images taking into account at least one projection mode. In other words, an implementation of one of the embodiment may reconstruct a connected component corresponding to a patch p as follows:

For each pixel (u,v) of patch p, d0(u,v) being a pixel in the first depth image, a module calculates a 3D point P0 from the first depth image as follows:

$$P0[p \cdot normalAxis] = p \cdot D1 + d0(x,y)$$

$$P0[p \cdot tangentAxis] = p \cdot U1 + u$$

$$P0[p \cdot bitangentAxis] = p \cdot V1 + v$$

Next, a module calculates a 3D point P1 from the first and second depth images:

$$sign = p \cdot ProjectionMode == 0 ? 1 : -1;$$

$$d1 = d0(x,y) + sign * min(max(0, delta\_depth(x,y)), surfaceThickness)$$

$$P1[p \cdot normalAxis] = p \cdot D1 + d1$$

$$P1[p \cdot tangentAxis] = p \cdot U1 + u$$

$$P1[p \cdot bitangentAxis] = p \cdot V1 + v$$

where p·ProjectionMode indicates a projection mode associated with a patch,

According to an embodiment of step 730 and 830, the projection mode (ProjectionMode parameter) used to project/reconstruct a connected component may be known (along with other parameters) in order to perform the de-projection. In the context of point cloud compression, this means that the projection mode may be known beforehand by an encoder and a decoder or sent from the encoder to the decoder in a bitstream.

According to an embodiment of step 730 and 830, a projection mode is signaled at the patch level according to a syntax of a syntax element ReadPatchMetadata( ) function whose syntax is given in Table 1.

TABLE 1

| | |
|---|---|
| For each patch | |
| U0 | DecodeUInt32(bitCountU0) |
| V0 | DecodeUInt32(bitCountV0) |
| U1 | DecodeUInt32(bitCountU1) |
| V1 | DecodeUInt32(bitCountV1) |
| D1 | DecodeUInt32(bitCountD1) |
| projectionMode | DecodeUInt32(bitCount ProjectionMode) |
| deltaSizeU0 | DecodeExpGolomb |
| deltaSizeV0 | DecodeExpGolomb |
| For all blocks | |
|   If number of candidate patches > 1 | |
|     Candidate index | Decode |
|     If Candidate index == maxCandidateCount | |
|       Read block to patch index | DecodeUInt32(bitCountPatch) |
|     Else | |
|       Block to patch index = Candidate index | |
| For all blocks | |
|   If Block to patch index > 0 | |
|     isFull | Decode |
|     If not Full | |
|       bestTraversalOrderIndex | Decode |
|       runCountMinusTwo | Decode |
|       Occupancy | Decode |
|       for (size_t r = 0; r < runCountMinusOne; ++r) | |
|         runLength | Decode |
|         for (size_t j = 0; ] <= runLength; ++j) | Decode |
|           Block[ traversalOrder[ i++ ] ] = occupancy; | |
|         occupancy = !occupancy; | |
|       For all resting block | |
|         Block[ traversalOrder[ i++ ] ] = occupancy; | |

According to an embodiments of step 730 and 830, a projection mode is signaled at the patch level if said projection mode is signaled at the point cloud level as changing.

For example, a first syntax element ProjectionModeGlobal is signaled. Said first syntax element, defined once per point cloud, indicates whether a projection mode (per patch) is 'variable' (0), 'always min' (1), or 'always max' (2). When the first syntax element indicates that a projection is variable, a second syntax element ProjectionMode, defined per patch, is also signaled.

For example, the first syntax element is added to the point cloud metadata, which in TMC2 is known as ReadOccupancyMap. Entropy coding could be optionally used for ProjectionModeGlobal instead of a fixed-length binary value.

A possible syntax of the first syntax element ReadOccupancyMap( ) function is given in Table 2.

TABLE 2

| | |
|---|---|
| Patch count | ReadUint32 |
| Occupancy precision | ReadUint8 |
| Max candidate count | ReadUint8 |
| Bit Count U0 | ReadUint8 |
| Bit Count V0 | ReadUint8 |
| Bit Count U1 | ReadUint8 |
| Bit Count V1 | ReadUint8 |
| Bit Count D1 | ReadUint8 |
| ProjectionModeGlobal | ReadUint8 |
| Arithmetic bitstream size | ReadUint32 |
| Arithmetic bitstream | ReadArithmetic( ) |

The syntax of the second syntax element ReadPatchMetadata( ) function may be given in Table 3.

TABLE 3

| | |
|---|---|
| For each patch | |
| U0 | DecodeUInt32(bitCountU0) |
| V0 | DecodeUInt32(bitCountV0) |
| U1 | DecodeUInt32(bitCountU1) |
| V1 | DecodeUInt32(bitCountV1) |
| D1 | DecodeUInt32(bitCountD1) |
| If( ! ProjectionModeGlobal ) | |
| ProjectionMode | DecodeUInt32(bitCount ProjectionMode) |
| Else | |
| ProjectionMode         = | |
| ProjectionModeGlobal − 1 | |
| deltaSizeU0 | DecodeExpGolomb |
| deltaSizeV0 | DecodeExpGolomb |
| For all blocks | |
| If number of candidate patches > 1 | |
| ... | ... |

According to an embodiment of step 710, a projection mode, indicating if an image region of a first depth image stores either the minimum or the maximum depth value of at least one orthogonally projected 3D point of the point cloud along a same projection direction, is determined as follows:

projecting all said at least one 3D point towards three main planes XY, XZ and YZ, projecting the distance from each 3D point to the projection plane (i.e. the depth). The projection follows, respectively, the Z, Y, and Z axis of a 3D space, either towards infinity or towards minus infinity. The results of the projections are stored in six different 2D planes with [bbox_x_size, bbox_y_size] size. Three arrays store the minimum depth values for XY, XZ and YZ planes and three others to store the maximum depth values for XY, XZ and YZ plans:

1) box_min_depth_array[x][bbox_x_size, bbox_y_size];
2) box_min_depth_array[y][bbox_x_size, bbox_y_size];
3) box_min_depth_array[z][bbox_x_size, bbox_y_size];

and 3 following 2D planes for storing the maximum depth value:

4) box_max_depth_array[x][bbox_x_size, bbox_y_size];
5) box_max_depth_array[y][bbox_x_size, bbox_y_size];
6) box_max_depth_array[z][bbox_x_size, bbox_y_size];

selecting the best depth stored in D0 (minimum or maximum) by projecting said at least one 3D point following the "normalAxis" direction assigned to the current patch. Then, checking if the current depth value is equal to the minimum depth value or the maximum depth value stored respectively in box_min_depth_array[normalAxis] and box_max_depth_array[normalAxis]. One counter, cptMinDepth or cptMaxDepth, is incremented according to the current depth value: cptMinDepth is incremented if the current depth is located in box_min_depth_array; cptMaxDepth is incremented if the current depth is located in box_max_depth_array.

The decision to store in D0 the minimum or maximum depth value is taken comparing cptMinDepth and cptMaxDepth. If cptMinDepth is larger than cptMaxDepth, the minimum depth value of said at least one 3D points is stored in the first depth image D0, otherwise the opposite (the maximum depth value of said at least one 3D point is stored).

According to an embodiment of step 710, a projection mode, indicating if an image region of a first depth image stores either the minimum or the maximum depth value of at least one orthogonally projected 3D point of the point cloud along a same projection direction, is determined by computing the energy of the image region of the first depth image using the minimum depth value and the maximum depth value and selected the version that minimizes the energy.

Different criteria may be used to compute the energy of said image region such as the variance or the gradient.

According to an embodiment of step 710, a projection mode, indicating if an image region of a first depth image stores either the minimum or the maximum depth value of at least one orthogonally projected 3D point of the point cloud along a same projection direction, is determined by minimizing the number of missing points.

For example, said at least one 3D point is projected and de-projected when the projection mode equals a first value (storing the minimum depth values in the first depth image D0), said at least one 3D point is projected and de-projected when the projection mode equals a second value (storing the maximum depth values in the first depth image D0), comparing the reconstructed 3D points (de-projected) with the "original" 3D points, counting the number of missing points, iterating the process when the projection mode equals a second value (storing the maximum depth value in the first depth image D0) and selecting the projection mode that minimizes the number of missing points.

According to a variant, the two previous embodiments of step 710 are combined to determine a projection mode that minimizes the energy of the first depth image and the number of missing points.

On FIG. 1-9, the modules are functional units, which may or not be in relation with distinguishable physical units. For example, these modules or some of them may be brought together in a unique component or circuit, or contribute to functionalities of a software. A contrario, some modules may potentially be composed of separate physical entities. The apparatus which are compatible with the present principles are implemented using either pure hardware, for example using dedicated hardware such ASIC or FPGA or VLSI, respectively «Application Specific Integrated Circuit», «Field-Programmable Gate Array», «Very Large Scale Integration», or from several integrated electronic components embedded in a device or from a blend of hardware and software components.

Figure 9:
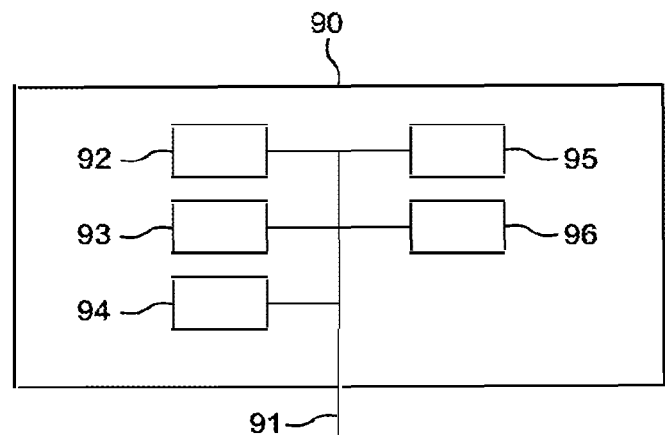
FIG. 9 represents an exemplary architecture of a device which may be configured to implement a method described in relation with FIG. 1-8.

FIG. 9 represents an exemplary architecture of a device 90 which may be configured to implement a method described in relation with FIG. 1-8.

Device 90 comprises following elements that are linked together by a data and address bus 91:
- a microprocessor 92 (or CPU), which is, for example, a DSP (or Digital Signal Processor);
- a ROM (or Read Only Memory) 93;
- a RAM (or Random Access Memory) 94;
- an I/O interface 95 for reception of data to transmit, from an application; and
- a battery 96.

In accordance with an example, the battery 96 is external to the device. In each of mentioned memory, the word register used in the specification can correspond to area of small capacity (some bits) or to very large area (e.g. a whole program or large amount of received or decoded data). The ROM 93 comprises at least a program and parameters. The ROM 93 may store algorithms and instructions to perform techniques in accordance with present principles. When switched on, the CPU 92 uploads the program in the RAM and executes the corresponding instructions.

RAM 94 comprises, in a register, the program executed by the CPU 92 and uploaded after switch on of the device 90, input data in a register, intermediate data in different states of the method in a register, and other variables used for the execution of the method in a register.

The implementations described herein may be implemented in, for example, a method or a process, an apparatus, a software program, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

In accordance with an example of encoding or an encoder, the ppoint cloud PC is obtained from a source. For example, the source belongs to a set comprising:
- a local memory (93 or 94), e.g. a video memory or a RAM (or Random Access Memory), a flash memory, a ROM (or Read Only Memory), a hard disk;
- a storage interface (95), e.g. an interface with a mass storage, a RAM, a flash memory, a ROM, an optical disc or a magnetic support;
- a communication interface (95), e.g. a wireline interface (for example a bus interface, a wide area network interface, a local area network interface) or a wireless interface (such as a IEEE 802.11 interface or a Bluetooth® interface); and
- an picture capturing circuit (e.g. a sensor such as, for example, a CCD (or Charge-Coupled Device) or CMOS (or Complementary Metal-Oxide-Semiconductor)).

In accordance with an example of the decoding or a decoder, the decoded first and/or second depth images or the reconstructed point cloud is (are) sent to a destination; specifically, the destination belongs to a set comprising:
- a local memory (93 or 94), e.g. a video memory or a RAM, a flash memory, a hard disk;
- a storage interface (95), e.g. an interface with a mass storage, a RAM, a flash memory, a ROM, an optical disc or a magnetic support;
- a communication interface (95), e.g. a wireline interface (for example a bus interface (e.g. USB (or Universal Serial Bus)), a wide area network interface, a local area network interface, a HDMI (High Definition Multimedia Interface) interface) or a wireless interface (such as a IEEE 802.11 interface, WiFi® or a Bluetooth® interface); and
- a display.

In accordance with examples of encoding or encoder, the bitstream B is sent to a destination. As an example, the bitstream B is stored in a local or remote memory, e.g. a video memory (94) or a RAM (94), a hard disk (93). In a variant, one or both bitstreams are sent to a storage interface (95), e.g. an interface with a mass storage, a flash memory, ROM, an optical disc or a magnetic support and/or transmitted over a communication interface (95), e.g. an interface to a point to point link, a communication bus, a point to multipoint link or a broadcast network.

In accordance with examples of decoding or decoder, the bitstream B is obtained from a source. Exemplarily, the bitstream is read from a local memory, e.g. a video memory (94), a RAM (94), a ROM (93), a flash memory (93) or a hard disk (93). In a variant, the bitstream is received from a storage interface (95), e.g. an interface with a mass storage, a RAM, a ROM, a flash memory, an optical disc or a magnetic support and/or received from a communication interface (95), e.g. an interface to a point to point link, a bus, a point to multipoint link or a broadcast network.

In accordance with examples, device 90 being configured to implement an method described in relation with FIG. 1-24, belongs to a set comprising:
- a mobile device;
- a communication device;
- a game device;
- a tablet (or tablet computer);
- a laptop;
- a still picture camera;
- a video camera;
- an encoding chip;
- a still picture server; and
- a video server (e.g. a broadcast server, a video-on-demand server or a web server).

In accordance with examples, device 90 being configured to implement a method described in relation with FIG. 1-24, belongs to a set comprising:
- a mobile device;
- a communication device;
- a game device;
- a set top box;
- a TV set;
- a tablet (or tablet computer);
- a laptop;
- a display and
- a decoding chip.

Figure 10:
FIG. 10 shows schematically a transmission system between devices A and B in accordance with an example of at least one embodiment.

According to an example of the present principles, illustrated in FIG. 10, in a transmission context between two remote devices A and B over a communication network NET, the device A comprises a processor in relation with memory RAM and ROM which are configured to implement a method for encoding the geometry of a point cloud as described in relation with the FIG. 1-8 and the device B comprises a processor in relation with memory RAM and ROM which are configured to implement a method for decoding a point cloud as described in relation with FIG. 1-8.

Implementations of the various processes and features described herein may be embodied in a variety of different equipment or applications. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and any other device for processing a picture or a video or other communication devices. As should be clear, the equipment may be mobile and even installed in a mobile vehicle.

Additionally, the methods may be implemented by instructions being performed by a processor, and such instructions (and/or data values produced by an implementation) may be stored on a computer readable storage medium. A computer readable storage medium can take the form of a computer readable program product embodied in one or more computer readable medium(s) and having computer readable program code embodied thereon that is executable by a computer. A computer readable storage medium as used herein is considered a non-transitory storage medium given the inherent capability to store the information therein as well as the inherent capability to provide retrieval of the information therefrom. A computer readable storage medium can be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present principles can be applied, is merely an illustrative and not exhaustive listing as is readily appreciated by one of ordinary skill in the art: a portable computer diskette; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

The instructions may form an application program tangibly embodied on a processor-readable medium.

Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described example of the present principles, or to carry as data the actual syntax-values written by a described example of the present principles. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method comprising:
  decoding first image data storing at least one first depth value of a first 3D point of a point cloud, the first 3D point and a second 3D point being orthogonally projected onto a same 2D point of a projection plane, the at least one first depth value being one of a minimum depth value from the projection plane or a maximum depth value from the projection plane, and the second 3D point having a second depth value being the other of the minimum depth value and the maximum depth value;
  deriving from a bitstream a projection mode signaled for a patch to which the 2D point belongs, the projection mode indicating whether the at least one first depth value is the minimum depth value or the maximum depth value; and
  reconstructing a geometry of the point cloud based on the projection mode.

2. The method of claim 1, wherein the first 3D point and the second 3D point correspond respectively to a nearest point and a farthest point of a connected component, from an origin of a projection axis when the projection mode equals a first value, and the first 3D point and the second 3D point correspond respectively to a farthest point and a nearest point of the connected component, from an origin of the projection axis when the projection mode equals a second value.

3. The method of claim 1, wherein the projection mode indicates whether the first image data stores depth values of nearest points projected onto the projection plane or farthest points projected onto the projection plane.

4. The method of claim 1, wherein the projection mode indicates whether the first image data stores depth values of nearest points projected onto the projection plane or farthest points projected onto the projection plane, and wherein an information representative of the projection mode is signaled at a point cloud level to indicate if the projection mode may change or not.

5. A non-transitory computer-readable medium including instructions for causing one or more processors to perform the steps of the method of claim 1.

6. The method of claim 1, further comprising decoding second image data storing an information representative of the second depth value, the information representative of the second depth value being an absolute difference between the at least one first depth value and the second depth value.

7. The method of claim 6, wherein reconstructing the geometry of the point cloud comprises reconstructing the first 3D point and the second 3D point from the first image data and the second image data as a function of the projection mode.

8. A device comprising at least one processor configured to:
    decode first image data storing at least one first depth value of a first 3D point of a point cloud, the first 3D point and a second 3D point being orthogonally projected onto a same 2D point of a projection plane, the at least one first depth value being one of a minimum depth value from the projection plane or a maximum depth value from the projection plane, and the second 3D point having a second depth value being the other of the minimum depth value and the maximum depth value;
    derive from a bitstream a projection mode signaled for a patch to which the 2D point belongs, the projection mode indicating whether the at least one first depth value is the minimum depth value or the maximum depth value; and
    reconstruct a geometry of the point cloud based on the projection mode.

9. The device of claim 8, wherein the first 3D point and the second 3D point correspond respectively to a nearest point and a farthest point of a connected component, from an origin of a projection axis when the projection mode equals a first value, and the first 3D point and the second 3D point correspond respectively to a farthest point and a nearest point of the connected component, from an origin of the projection axis when the projection mode equals a second value.

10. The device of claim 8, wherein the projection mode indicates whether the first image data stores depth values of nearest points projected onto the projection plane or farthest points projected onto the projection plane.

11. The device of claim 8, wherein the projection mode indicates whether the first image data stores depth values of nearest points projected onto the projection plane or farthest points projected onto the projection plane, and wherein an information representative of the projection mode is signaled at a point cloud level to indicate if the projection mode may change or not.

12. A method comprising:
    encoding first image data comprising at least one first depth value of a first 3D point of a point cloud, the first 3D point and a second 3D point being orthogonally projected onto a same 2D point of a projection plane, the at least one first depth value being one of a minimum depth value from the projection plane or a maximum depth value from the projection plane, and the second 3D point having a second depth value being the other of the minimum depth value and the maximum depth value; and
    signaling, in a bitstream, a projection mode for a patch to which the 2D point belongs, the projection mode indicating whether the at least one first depth value is the minimum depth value or the maximum depth value.

13. The method of claim 12, wherein the projection mode indicates whether the first image data stores depth values of nearest points projected onto the projection plane or farthest points projected onto the projection plane, and wherein an information representative of the projection mode is signaled at a point cloud level to indicate if the projection mode may change or not.

14. The method of claim 12, wherein the projection mode is signaled at a patch level if the projection mode is signaled at the point cloud level as changing.

15. A non-transitory computer-readable medium including instructions for causing one or more processors to perform the steps of the method of claim 12.

16. The non-transitory computer-readable medium of claim 15, wherein the projection mode indicates whether the first image data stores depth values of nearest points projected onto the projection plane or farthest points projected onto the projection plane.

17. The method of claim 12, further comprising encoding second image data storing an information representative of the second depth value, the information representative of the second depth value being an absolute difference between the at least one first depth value and the second depth value.

18. A device comprising at least one processor configured to:
    encode first image data comprising at least one first depth value of a first 3D point of a point cloud, the first 3D point and a second 3D point being orthogonally projected onto a same 2D point of a projection plane, the at least one first depth value being one of a minimum depth value from the projection plane or a maximum depth value from the projection plane, and the second 3D point having a second depth value being the other of the minimum depth value and the maximum depth value; and
    signal, in a bitstream, a projection mode for a patch to which the 2D point belongs, the projection mode indicating whether the at least one first depth value is the minimum depth value or the maximum depth value.

19. The device of claim 18, wherein the first 3D point and the second 3D point correspond respectively to a nearest point and a farthest point of a connected component, from an origin of a projection axis when the projection mode equals a first value, and the first 3D point and the second 3D point correspond respectively to a farthest point and a nearest point of the connected component, from an origin of the projection axis when the projection mode equals a second value.

20. The device of claim 18, wherein the projection mode indicates whether the first image data stores depth values of nearest points projected onto the projection plane or farthest points projected onto the projection plane.

21. The device of claim 18, wherein the at least one processor is further configured to:
    encode second image data storing an information representative of the second depth value, the information representative of the second depth value being an absolute difference between the at least one first depth value and the second depth value.

* * * * *